United States Patent
Kojima

(10) Patent No.: US 10,119,593 B2
(45) Date of Patent: Nov. 6, 2018

(54) VIBRATION ISOLATION DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/514,222

(22) PCT Filed: Aug. 31, 2015

(86) PCT No.: PCT/JP2015/074655
§ 371 (c)(1),
(2) Date: Mar. 24, 2017

(87) PCT Pub. No.: WO2016/052045
PCT Pub. Date: Apr. 7, 2016

(65) Prior Publication Data
US 2017/0299013 A1    Oct. 19, 2017

(30) Foreign Application Priority Data
Oct. 3, 2014    (JP) .................................. 2014-205040

(51) Int. Cl.
F16F 15/08    (2006.01)
F16F 3/087    (2006.01)
B60K 5/12    (2006.01)

(52) U.S. Cl.
CPC ............ F16F 15/08 (2013.01); F16F 3/0873 (2013.01); B60K 5/1208 (2013.01)

(58) Field of Classification Search
CPC ........ F16F 15/08; F16F 3/0873; B60K 5/1208
See application file for complete search history.

(56) References Cited

U.S. PATENT DOCUMENTS

2008/0079205 A1    4/2008 Hayashi et al.
2008/0196987 A1*    8/2008 Niwa ................... F16F 1/3828
                                                              188/379
(Continued)

FOREIGN PATENT DOCUMENTS

CN    101392811 A    3/2009
CN    103339406 A    10/2013
(Continued)

OTHER PUBLICATIONS

Communication dated Sep. 4, 2017 issued by the European Patent Office in counterpart application No. 15845807.5.
(Continued)

Primary Examiner — Vishal R Sahni
(74) Attorney, Agent, or Firm — Sughrue Mion, PLLC

(57) ABSTRACT

A vibration isolation device (10) includes a first mounting member (11) connected to one of a vibration generating portion and a vibration receiving portion, and a second mounting member (12) connected to the other; an elastic body (13) disposed between the mounting members (11, 12); a first stopper elastic body (27) having a first stopper surface (26) which is disposed on either one of opposing surfaces (24, 25) that oppose each other, respectively on the first mounting member (11) and the second mounting member (12), and which faces the other surface such as to be capable of coming into contact therewith; and a second stopper elastic body (29) having a second stopper surface (28) which is disposed on either one of the opposing surfaces (24, 25), respectively on the first mounting member (11) and the second mounting member (12), and which faces the other surface such as to be capable of coming into contact therewith. The distance between the first stopper surface (26) and the opposing surface (24) facing the first stopper surface (26) is smaller than the distance between the second stopper (Continued)

surface (28) and the opposing surface (24) facing the second stopper surface (28).

3 Claims, 3 Drawing Sheets

(56) References Cited

U.S. PATENT DOCUMENTS

| | | | |
|---|---|---|---|
| 2009/0079116 A1 | 3/2009 | Yoshii et al. | |
| 2013/0313399 A1 | 11/2013 | Tsutsumi et al. | |
| 2016/0053848 A1* | 2/2016 | Nakamura | F16F 1/3842 248/634 |

FOREIGN PATENT DOCUMENTS

| | | |
|---|---|---|
| JP | 684044 U | 12/1994 |
| JP | 2008185153 A | 8/2008 |
| JP | 2008202722 A | 9/2008 |
| JP | 2009014080 A | 1/2009 |
| JP | 2011247333 A | 12/2011 |
| JP | 2013-108555 A | 6/2013 |
| WO | 2013/057408 A1 | 4/2013 |

OTHER PUBLICATIONS

International Search Report of PCT/JP2015/074655, dated Oct. 6, 2015 (PCT/ISA/210 and PCT/ISA/220).

Communication dated Jun. 5, 2018 from the State Intellectual Property Office of the P.R.C. in counterpart application No. 2015800520916.

* cited by examiner

VIBRATION ISOLATION DEVICE

CROSS REFERENCE TO RELATED APPLICATIONS

This application is a National Stage of International Application No. PCT/JP2015/074655 filed Aug. 31, 2015, claiming priority based on Japanese Patent Application No. 2014-205040, filed Oct. 3, 2014, the contents of all of which are incorporated herein by reference in their entirety.

TECHNICAL FIELD

The present invention relates to a vibration isolation device that is applied, for example, to automobiles, industrial machinery or the like, and that absorbs and dampens vibrations in vibration generating portions such as engines.

The present application claims priority on the basis of Japanese Patent Application No. 2014-205040, filed in Japan on Oct. 3, 2014, the content of which is incorporated herein by reference.

BACKGROUND ART

Conventionally, vibration isolation devices such as that described, for example, in the below-mentioned Patent Document 1 are known. This vibration isolation device comprises a first mounting member connected to one of a vibration generating portion and a vibration receiving portion, and a second mounting member connected to the other; an elastic body that is disposed between the mounting members; and a stopper elastic body having a stopper surface which is disposed on either one of opposing surfaces that oppose each other, respectively on the first mounting member and the second mounting member, and which faces the other surface so as to be capable of coining into contact therewith.

In this vibration isolation device, a load is applied in an opposition direction in which the opposing surfaces of the first mounting member and the second mounting member oppose each other, and when the first mounting member and the second mounting member move relative to each other in the opposition direction, the stopper surface of the stopper elastic body comes into contact with the opposing surface opposing that stopper surface, and relative movement between the mounting members is restricted.

RELATED DOCUMENT

Patent Document

[Patent Document 1]
Japanese Patent Application, First Publication No. 2013-108555

SUMMARY OF INVENTION

Technical Problem

However, the aforementioned conventional vibration isolation device has a problem in that, when a load is applied, a heavy burden is placed on the stopper elastic body, and it is difficult to ensure durability.

The present invention was made in consideration of the aforementioned circumstances, and has the purpose of offering a vibration isolation device in which the durability can be improved.

Solution to Problem

In order to solve the aforementioned problem, the present invention proposes the following means.

The vibration isolation device according to the present invention comprises a first mounting member connected to one of a vibration generating portion and a vibration receiving portion, and a second mounting member connected to the other thereof; an elastic body disposed between the mounting members; a first stopper elastic body having a first stopper surface which is disposed on either one of opposing surfaces that oppose each other, respectively on the first mounting member and the second mounting member, and which faces the other surface such as to be capable of coming into contact therewith; and a second stopper elastic body having a second stopper surface which is disposed on either one of the opposing surfaces, respectively on the first mounting member and the second mounting member, and which faces the other surface such as to be capable of coming into contact therewith. The distance between the first stopper surface and the opposing surface facing the first stopper surface is smaller than the distance between the second stopper surface and the opposing surface facing the second stopper surface.

Advantageous Effects of Invention

According to the present invention, the durability can be improved.

DESCRIPTION OF EMBODIMENTS

Hereinafter, a vibration isolation device 10 according to a first embodiment of the present invention will be explained with reference to FIG. 1 to FIG. 3.

Figure 1:
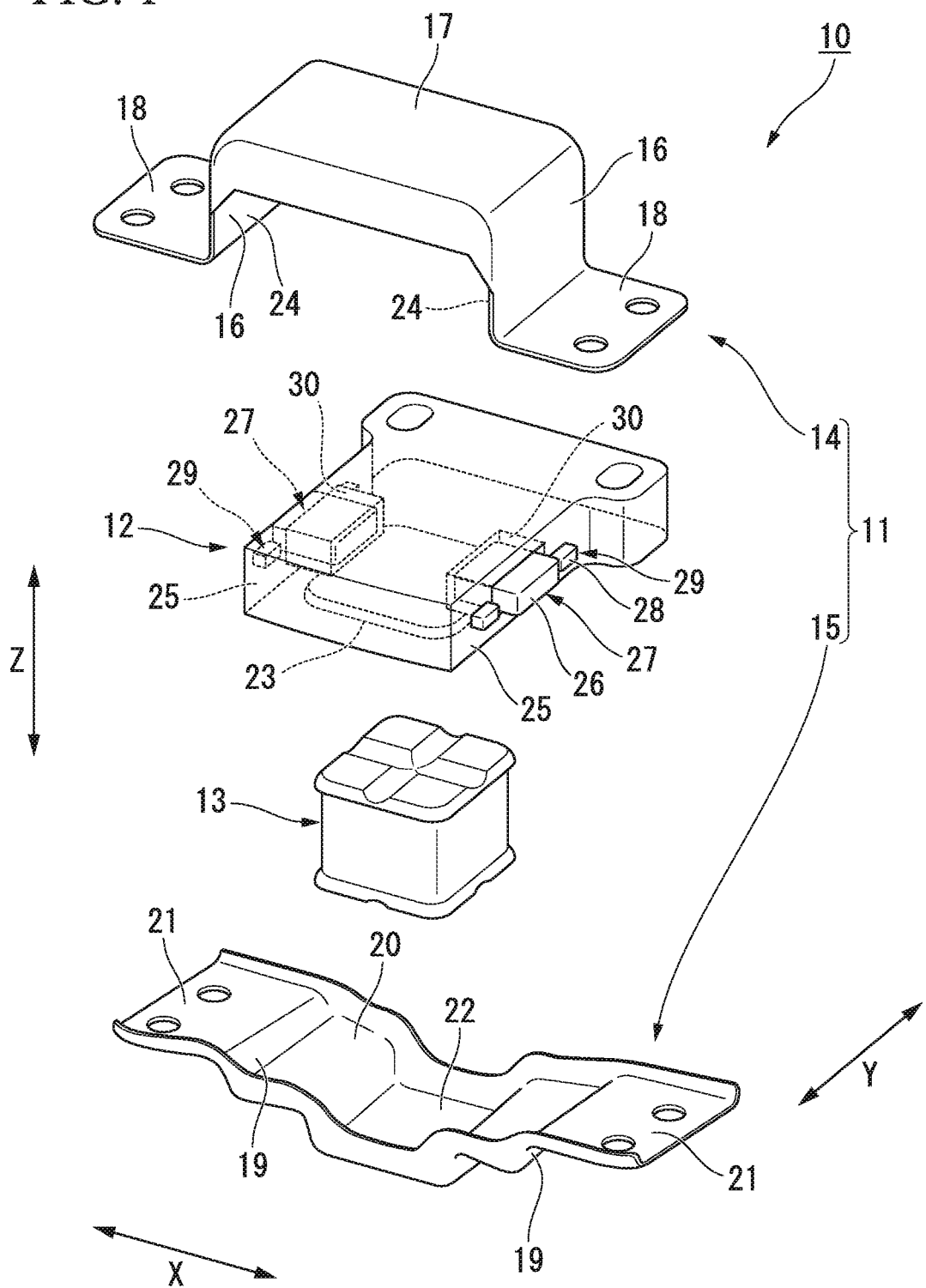
FIG. 1 is an exploded perspective view of a vibration isolation device according to an embodiment of the present invention.

As shown in FIG. 1, the vibration isolation device 10 comprises a first mounting member 11 connected to one of a vibration generating portion and a vibration receiving portion, and a second mounting member 12 connected to the other thereof; and an elastic body 13 disposed between the mounting members 11 and 12.

The first mounting member 11 is formed in the shape of a tub and the second mounting member 12 and the elastic body 13 are provided on the inside of the first mounting member 11. The elastic body 13 is sandwiched between the first mounting member 11 and the second mounting member 12.

Hereinafter, the direction in which the first mounting member 11 and the second mounting member 12 sandwich the elastic body 13 will be referred to as the up-down direction Z, and in the horizontal directions orthogonal to the up-down direction Z, the direction in which opening portions of the tubular first mounting member 11 open will be referred to as the left-right direction Y. Furthermore, the direction orthogonal to both the up-down direction Z and the left-right direction Y shall be referred to as the front-rear direction X.

The first mounting member 11 comprises an upper member 14 positioned on an upper side, and a lower member 15 positioned on a lower side. The first mounting member 11 is formed in the shape of a tube that opens in the left-right direction Y, by assembling the upper member 14 and the lower member 15 in the up-down direction. The opening portions of the first mounting member 11 have a rectangular shape when viewed from the left-right direction Y.

The upper member 14 comprises a front and rear pair of first side walls 16, a top wall 17 connecting the upper ends of these first side walls 16 with each other, and first flange portions 18 separately protruding, to the outside in the front-rear direction X, from the lower ends of the pair of first side walls 16. The lower member 15 comprises a front and rear pair of second side walls 19, a bottom wall 20 connecting the lower ends of these second side walls 19 with each other, and second flange portions 21 separately protruding, to the outside in the front-rear direction X, from the upper ends of the pair of second side walls 19. The bottom wall 20 is provided with a first fitting recess portion 22 into which a lower end portion of the elastic body 13 is fitted.

The first flange portions 18 and the second flange portions 21 are stacked in the up-down direction Z and connected to form the first mounting member 11.

Figure 2:
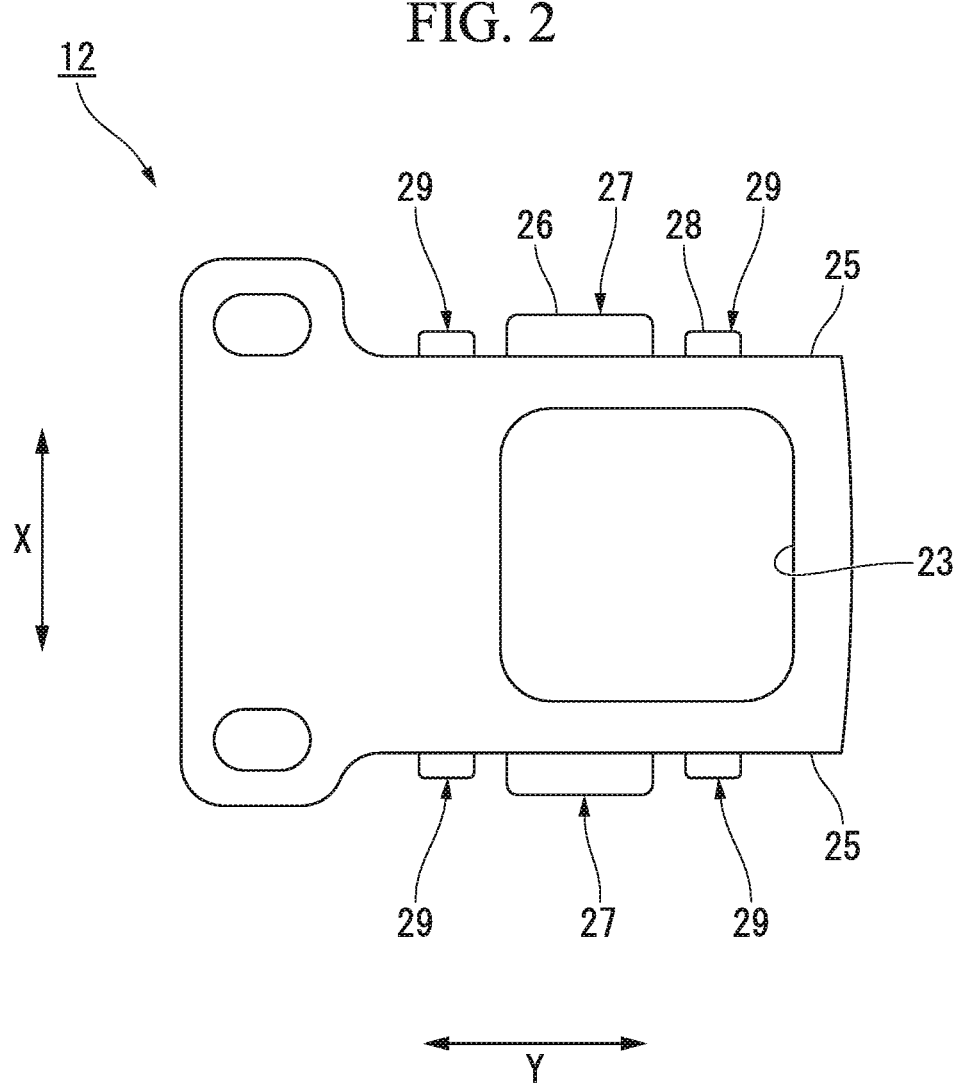
FIG. 2 is a bottom view of a second mounting member constituting the vibration isolation device shown in FIG. 1.

As shown in FIG. 1 and FIG. 2, the second mounting member 12 is formed in the shape of a plate. The obverse and reverse surfaces of the second mounting member 12 extend in both the front-rear direction X and the left-right direction Y, and in other words, are orthogonal to the up-down direction Z. One end portion of the second mounting member 12 in the left-right direction Y protrudes to the outside of the first mounting member 11, and the end portions, in the front-rear direction X, of this one end portion are connected to the vibration generating portion or the vibration receiving portion. A second fitting recess portion 23, into which the upper end portion of the elastic body 13 is fitted, is formed on the lower surface of the second mounting member 12.

The elastic body 13 is formed in the shape of a block, from an elastic material such as, for example rubber.

In the above configuration, an inner surface 24 (opposing surface) of a first side wall 16 of the first mounting member 11 and an end surface 25 (opposing surface) that faces in the front-rear direction X, among the surfaces of the second mounting member 12, oppose each other in the front-rear direction X (opposition direction).

Figure 3:
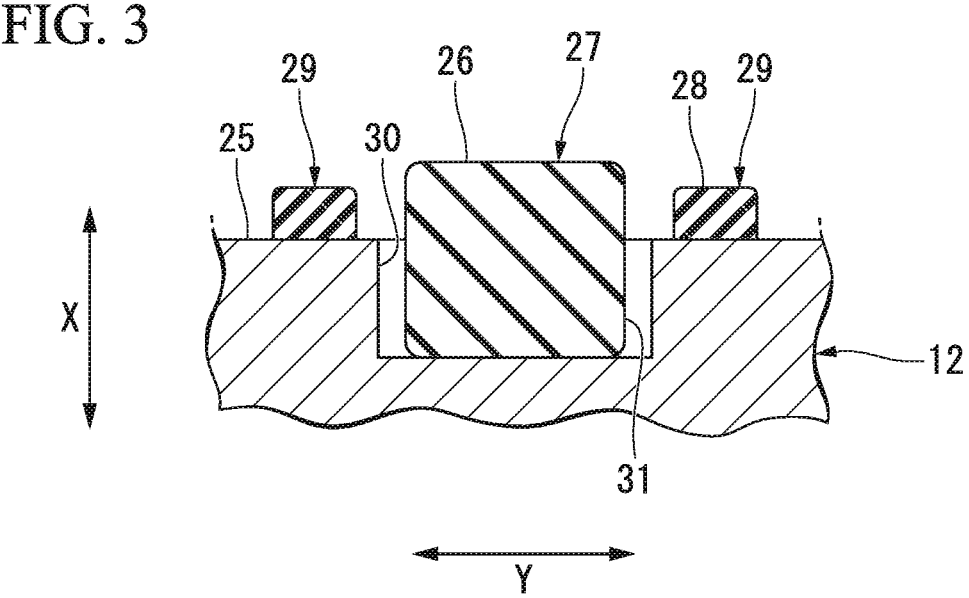
FIG. 3 is a section view of an essential portion of the second mounting member shown in FIG. 2.

As shown in FIG. 1 to FIG. 3, first stopper elastic bodies 27 and second stopper elastic bodies 29 are disposed on the end surfaces 25 of the second mounting member 12. The first stopper elastic bodies 27 have first stopper surfaces 26 that can come into contact with the inner surfaces 24 of the first side walls 16. The second stopper elastic bodies 29 have second stopper surfaces 28 that can come into contact with the inner surfaces 24 of the first side walls 16. The first stopper elastic bodies 27 and second stopper elastic bodies 29 are separately provided on both end surfaces 25 of the second mounting member 12. In other words, both of the end surfaces 25 of the second mounting member 12 are provided with the first stopper elastic body 27 and the second stopper elastic body 29.

The first stopper elastic bodies 27 and the second stopper elastic bodies 29 are provided in common on the end surfaces 25 of the second mounting member 12. In other words, both the first stopper elastic body 27 and the second stopper elastic body 29 are provided on each end surface 25 of the second mounting member 12. The first stopper elastic bodies 27 and the second stopper elastic bodies 29 are formed independently of each other, and are not integrated, being formed from separate bodies. The first stopper elastic bodies 27 and the second stopper elastic bodies 29 may, for example, be formed from the same material.

The distance between a first stopper surface 26 and the inner surface 24 of the first side wall 16 is smaller than the distance between a second stopper surface 28 and the inner surface 24 of the first side wall 16. In the present embodiment, the positions of the first stopper surface 26 and the second stopper surface 28 in the front-rear direction X are different from each other, and the first stopper surface 26 is positioned further outside than the second stopper surface 28 in the front-rear direction X. As a result, the distance between the first stopper surface 26 and the inner surface 24 of the first side wall 16 in the front-rear direction X is smaller than the distance between the second stopper surface 28 and the inner surface 24 of the first side wall 16 in the front-rear direction X.

The first stopper elastic bodies 27 are formed in the shape of rectangular parallelepipeds. The first stopper elastic bodies 27, in plan view when seen from the up-down direction Z, have a rectangular shape with a pair of sides extending in the front-rear direction X and the other pair of sides extending in the left-right direction Y. The first stopper elastic bodies 27, in a side view when seen from the front-rear direction X, have a rectangular shape with a pair of sides extending in the left-right direction Y and the other pair of sides extending in the up-down direction Z.

Hollow portions 30, in which the first stopper elastic bodies 27 are disposed, are formed on the end surfaces 25 of the second mounting member 12. In the surfaces of the first stopper elastic body 27, the surface facing the direction opposed to the first stopper surface 26 is bonded to an inner surface of the hollow portion 30. The first stopper elastic body 27 is disposed in the hollow portion 30 in a state such that the first stopper surface 26 protrudes from the end surface 25 of the second mounting member 12.

In the surfaces of the first stopper elastic body 27, at least a portion of a side surface 31 that extends from the end surface 25 of the second mounting member 12 towards the inner surface 24 of the first side wall 16 of the first mounting member 11 (from the inside to the outside in the front-rear direction X) is not in contact with the inner surface of the hollow portion 30. In the illustrated example, the entire side surface 31 of the first stopper elastic body 27 is not in contact with the inner surface of the hollow portion 30, and gaps are provided between the side surfaces 31 of the first stopper elastic body 27 and the inner surfaces of the hollow portions 30 around the entire perimeter in the aforementioned side view.

The second stopper elastic bodies 29 are disposed in the periphery of the opening of the hollow portion 30 on the end surface 25 of the second mounting member 12. In the illustrated example, the second stopper elastic bodies 29 are disposed separately on the end surface 25 of the second mounting member 12, at both sides of the first stopper elastic body 27 in the left-right direction Y. The volume of the first stopper elastic body 27 is greater than the total volume of the pair of second stopper elastic bodies 29.

Next, the actions of the vibration isolation device 10 will be explained.

When a vibration isolation device 10 is mounted on an automobile, the second mounting member 12 is connected to an engine, which is a vibration generating portion, and the first mounting member 11 is connected to the vehicle body, which is a vibration receiving portion, so as to suppress the transmission of engine vibrations to the vehicle body. At this time, the vibration isolation device 10 is mounted to the automobile so that the up-down direction Z in the vibration isolation device 10 is aligned with the vertical direction, and the front-rear direction X in the vibration isolation device 10 is aligned with the front-rear direction of the vehicle body.

When a load (vibration) is applied to the vibration isolation device 10 from the front-rear direction X, the first and second mounting members 11 and 12 move relative to each other in the front-rear direction X, and one of the end surfaces 25 of the second mounting member 12 in the front-rear direction X approaches the inner surface 24 of the first side wall 16 of the first mounting member 11 facing this end surface 25. Then, the first stopper surface 26 of the first stopper elastic body 27 provided on this end surface 25 of the second mounting member 12 comes into contact with the inner surface 24 of the first side wall 16, and the first stopper elastic body 27 restricts the relative movement between the mounting members 11 and 12.

When an even larger load is applied in the front-rear direction X, the second stopper surface 28 and the inner surface 24 of the first side wall 16 come into contact while the first stopper elastic body 27 is compressively deformed in the front-rear direction X by the inner surface 24 of the first side wall 16, thereby causing the first and second stopper elastic bodies 27 and 29 to restrict the relative movement of the mounting members 11 and 12.

As explained above, with the vibration isolation device 10 according to the present embodiment, when a small load is applied, the first stopper elastic body 27 alone restricts the relative movement between the mounting members 11 and 12, and when a large load is applied, the relative movement between the mounting members 11 and 12 is restricted by both the first and second stopper elastic bodies 27 and 29. As a result, a large applied load can be received not only by the first stopper elastic body 27, but also by the second stopper elastic body 29, thus suppressing the burden placed on the first and second stopper elastic bodies 27 and 29, and allowing the durability of the vibration isolation device 10 to be improved.

Additionally, since the first stopper elastic bodies 27 are disposed in hollow portions 30, the size of the vibration isolation device 10 in the front-rear direction X can be held small, while easily ensuring that the first stopper elastic bodies 27 have sufficient size in the front-rear direction X. Furthermore, a gap is provided between at least a portion of the side surface 31 of the first stopper elastic body 27 and the inner surfaces of the hollow portion 30. Therefore, when a compressive load is applied to the stopper elastic body 27 in the front-rear direction X, the first stopper elastic body 27 can expand towards the portions of the inner surfaces of the hollow portion 30 that are not in contact with the side surfaces 31 of the first stopper elastic body 27.

Due to the above features, it is possible to suppress increases in the spring constant when a first stopper surface 26 comes into contact with an inner surface 24 of a first side wall 16, thereby suppressing sudden increases in the spring constant when a small load is applied.

Additionally, since the first stopper surfaces 26 protrude from the end surfaces 25 of the second mounting member 12, it is possible to ensure that the first stopper elastic bodies 27 have sufficient size in the front-rear direction X, thereby reliably suppressing sudden increases in the spring constant when a small load is applied.

The technical scope of the present invention is not to be construed as being limited to the foregoing embodiments, and various modifications may be added within a range not departing from the gist of the present invention.

Figure 4:
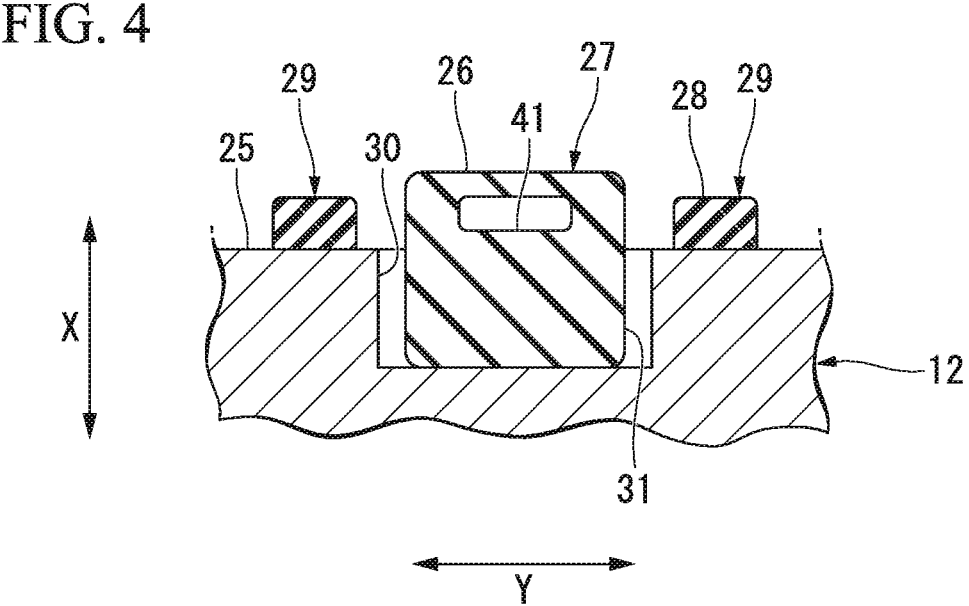
FIG. 4 is a section view of an essential portion of the second mounting member constituting the vibration isolation device according to a modification example of the present invention.

For example, as shown in FIG. 4, it is possible to form a cavity portion 41 in a first stopper elastic body 27. In the illustrated example, the cavity portion 41 is formed on the end which is adjacent to the first stopper surface 26 of the first stopper elastic body 27. The cavity portion 41 is in the shape of a rectangle that is long in the left-right direction Y and short in the front-rear direction X, in a sectional view along both the front-rear direction X and the left-right direction Y.

Additionally, the first stopper surface 26 may be formed in a waved shape having alternately repeating expanded portions that are expanded in the front-rear direction X and depressed portions that are depressed in the front-rear direction X.

Additionally, the end which is adjacent to the first stopper surface 26 of the first elastic body 27 may be formed in the shape of a bellows so as to be able to easily deform in the front-rear direction X.

In these cases, it is possible to reliably suppress increases in the spring constant when the first stopper surface 26 comes into contact with the inner surface 24 of the first side wall 16 of the first mounting member 11 facing this first stopper surface 26.

In the present invention, the hollow portion 30 may be absent. For example, the first stopper elastic body 27 may be vulcanization-bonded to a portion of the end surface 25 of the second mounting member 12 where the hollow portion 30 is not formed.

In the aforementioned embodiment, the first stopper elastic bodies 27 and the second stopper elastic bodies 29 are provided in common on the end surfaces 25 of the second mounting member 12, however, the present invention is not limited to such a configuration. For example, it is possible to provide one of the first stopper elastic bodies 27 and the second stopper elastic bodies 29 on the end surfaces 25 of the second mounting member 12, and to provide the other type of elastic body on the inner surfaces 24 of the first side walls 16 of the first mounting members 11.

In the aforementioned embodiment, the first mounting member 11 was formed in the shape of a rectangle when viewed from the left-right direction Y, however, the present invention is not limited to such a configuration. For example, the first mounting member 11 may be in the form of a circle or an ellipse when viewed from the left-right direction Y.

In the aforementioned embodiment, the second mounting member 12 is connected to an engine and the first mounting member 11 is connected to a vehicle body, however, they may be connected in the inverted manner.

Furthermore, the vibration isolation device 10 according to the present invention is not limited to application to an engine mount of a vehicle, and may be applied to devices other than engine mounts. For example, it may be applied to a generator mount provided in construction machinery, or to a mount for machinery installed in a factory or the like.

In addition thereto, it is possible to appropriately replace elements in the aforementioned embodiment with well-known elements, or to appropriately combine the aforementioned modification examples, within a range not departing from the gist of the present invention.

INDUSTRIAL APPLICABILITY

The durability of a vibration isolation device can be improved.

REFERENCE SIGNS LIST

10 Vibration isolation device
11 First mounting member
12 Second mounting member
13 Elastic body
24 Inner surface (opposing surface)
25 End surface (opposing surface)
26 First stopper surface
27 First stopper elastic body
28 Second stopper surface
29 Second stopper elastic body
30 Hollow portion
31 Side surface

The invention claimed is:

1. A vibration isolation device comprising:
   a first mounting member connected to one of a vibration generating portion and a vibration receiving portion, and a second mounting member connected to the other thereof;
   an elastic body disposed between the mounting members;
   a first stopper elastic body having a first stopper surface, the first stopper elastic body being disposed on one of opposing surfaces that oppose each other, respectively on the first mounting member and the second mounting member, the first stopper surface facing the other one of the opposing surfaces such as to be capable of coming into contact therewith; and
   a second stopper elastic body having a second stopper surface, the second stopper elastic body being disposed on one of the opposing surfaces, respectively on the first mounting member and the second mounting member, the second stopper surface facing the other one of the opposing surfaces such as to be capable of coming into contact therewith,
   wherein a distance between the first stopper surface and the other one of the opposing surfaces facing the first stopper surface is smaller than a distance between the second stopper surface and the other one of the opposing surfaces facing the second stopper surface, and
   wherein:
   a hollow portion, in which a first stopper elastic member is disposed, is formed in the one of the opposing surfaces of the first mounting member or the second mounting member;
   a gap is provided between at least a portion of a side surface of the first stopper elastic body and an inner surface of the hollow portion;
   in the surfaces of the first stopper elastic body, the surface facing the direction opposed to the first stopper surface is bonded to an inner surface of the hollow portion; and
   gaps are provided between the side surfaces of the first stopper elastic body and the inner surfaces of the hollow portions around the entire perimeter in the aforementioned side view.

2. The vibration isolation device according to claim 1, wherein the first stopper surface protrudes from the one of the opposing surfaces on which the hollow portion is formed.

3. The vibration isolation device according to claim 1, wherein the entire side surface of the first stopper elastic body is not in contact with the inner surface of the hollow portion.

* * * * *